US008589568B2

(12) United States Patent
Arnold et al.

(10) Patent No.: US 8,589,568 B2
(45) Date of Patent: Nov. 19, 2013

(54) METHOD AND SYSTEM FOR SECURE HANDLING OF ELECTRONIC BUSINESS TRANSACTIONS ON THE INTERNET

(75) Inventors: Oksana Arnold, Frankfurt (DE); Andreas Werner, Glashuetten (DE); Ulrich Kraemer, Darmstadt (DE); Thomas Lentz, Frankfurt/M (DE)

(73) Assignee: International Business Machines Corporation, Armonk, NY (US)

( * ) Notice: Subject to any disclaimer, the term of this patent is extended or adjusted under 35 U.S.C. 154(b) by 3055 days.

(21) Appl. No.: 10/499,275

(22) PCT Filed: Nov. 29, 2002

(86) PCT No.: PCT/EP02/13493
§ 371 (c)(1),
(2), (4) Date: Feb. 9, 2005

(87) PCT Pub. No.: WO03/055170
PCT Pub. Date: Jul. 3, 2003

(65) Prior Publication Data
US 2005/0120221 A1 Jun. 2, 2005

(30) Foreign Application Priority Data

Dec. 21, 2001 (EP) .................................... 01130600

(51) Int. Cl.
*G06F 15/177* (2006.01)
(52) U.S. Cl.
USPC ............... 709/228; 709/224; 705/40; 726/10; 726/12; 726/15; 726/26; 726/28
(58) Field of Classification Search
USPC ........................ 709/226–229; 705/40; 726/6
See application file for complete search history.

(56) References Cited

U.S. PATENT DOCUMENTS

| 5,815,573 | A | 9/1998 | Johnson et al. |
| 5,845,070 | A | 12/1998 | Ikudome .................. 395/187.01 |

(Continued)

FOREIGN PATENT DOCUMENTS

| EP | 1039724 A2 | 10/1999 | .............. H04L 29/06 |
| JP | PUPA10-041932 | 2/1998 | |

(Continued)

OTHER PUBLICATIONS

David M. Martin Jr; 'A Framework for Local Anonymity in the Internet', Boston University Boston, MA, USA, Feb. 21, 1998, p. 1-p. 14.

(Continued)

*Primary Examiner* — Greg C Bengzon
(74) *Attorney, Agent, or Firm* — Schmeiser, Olsen & Watts, LLP; William E. Schiesser (57) ABSTRACT

Disclosed is a computer-based technology for handling end-to-end business transactions in a TCP/IP-environment. A managing instance enables logon and provides a pool of IP addresses available for allocation. The managing instance allocates an IP address from the pool and establishes a tunneling IP connection between the managing instance and a user's device. The user's IP address together with any attributes relevant for accounting, authentication and authorization (AAA) are stored during the session time. The correlation between a user's authentication name and an IP address assigned to that name as well as the book-keeping of the validity of that correlation is handled using a session context. Any identification process for a user/subscriber who would like to use any service offered by an e-Service provider will be conducted solely using the assigned IP address.

9 Claims, 6 Drawing Sheets (56) References Cited

U.S. PATENT DOCUMENTS

| | | | | |
|---|---|---|---|---|
| 5,845,267 | A | * | 12/1998 | Ronen .................... 705/40 |
| 5,978,568 | A | * | 11/1999 | Abraham et al. ............ 709/224 |
| 6,032,260 | A | | 2/2000 | Sasmazel et al. ............ 713/202 |
| 6,119,160 | A | | 9/2000 | Zhang et al. |
| 6,311,275 | B1 | | 10/2001 | Jin et al. .................. 713/201 |
| 6,427,170 | B1 | * | 7/2002 | Sitaraman et al. ............ 709/226 |
| 6,526,131 | B1 | * | 2/2003 | Zimmerman et al. ... 379/106.09 |
| 6,631,416 | B2 | * | 10/2003 | Bendinelli et al. ............ 709/227 |
| 7,340,518 | B1 | * | 3/2008 | Jenkins ..................... 709/225 |
| 2002/0007345 | A1 | * | 1/2002 | Harris ........................ 705/44 |
| 2002/0041605 | A1 | * | 4/2002 | Benussi et al. ............... 370/467 |
| 2002/0116501 | A1 | * | 8/2002 | Ho et al. ...................... 709/227 |
| 2002/0144144 | A1 | * | 10/2002 | Weiss et al. ................. 713/201 |
| 2006/0089977 | A1 | * | 4/2006 | Cramer et al. ................. 709/218 |

FOREIGN PATENT DOCUMENTS

| | | |
|---|---|---|
| JP | PUPA2000-259566 | 9/2000 |
| JP | PUPA2001-236315 | 8/2001 |
| KR | PUPA 2001/104102 | 11/2001 |
| WO | WO 01/13598 A2 | 8/2000 ............. H04L 29/00 |

OTHER PUBLICATIONS

Marc Rennhard et al.; 'An Architecture for an Anonymity Network', Enabling Technologies: Infrastructure for Collaborative Enterprises, 2001, WET IC Tenth IEEE International Workshops on IEEE, Jun. 22, 2001, p. 165-p. 170.

Jonathan Davidson; VoIP Basic Guide Understanding of IP Based Voice Data Service Function, Japan, SoftBank Publishing Corporation, Jan. 18, 2001, First Edition, p. 211-p. 214.

* cited by examiner

| | I | II | III | IV | V | VI |
|---|---|---|---|---|---|---|
| | e-Service Provider<br>★ Content<br>★ Service<br>★ Goods | | | e-Service Provider<br>★ Content<br>★ Service<br>★ Goods | | e-Service Provider<br>★ Content<br>★ Service<br>★ Goods |
| | e-Company<br>★ Any company's business unit(s)<br>★ User (subscriber, employee, company, device)<br>★ Inter company | e-Company<br>★ Any company's business unit(s)<br>★ User (subscriber, employee, company, device)<br>★ Inter company | | e-Company<br>★ Any company's business unit(s)<br>★ User (subscriber, employee, company, device)<br>★ Inter company | e-Company<br>★ Any company's business unit(s)<br>★ User (subscriber, employee, company, device)<br>★ Inter company | e-Company<br>★ Any company's business unit(s)<br>★ User (subscriber, employee, company, device)<br>★ Inter company |
| | Middleware<br>★ Session context<br>★ Workflow component<br>★ Peering component | Middleware<br>★ Session context<br>★ Workflow component<br>★ Peering component | Middleware<br>★ Session context<br>★ Workflow component<br>★ Peering component | Middleware<br>★ Session context<br>★ Workflow component<br>★ Peering component | Middleware<br>★ Session context<br>★ Workflow component<br>★ Peering component | |
| | e-Network Provider<br>★ Remote access<br>★ Backbone<br>★ NOC | e-Network Provider<br>★ Remote access<br>★ Backbone<br>★ NOC | e-Network Provider<br>★ Remote access<br>★ Backbone<br>★ NOC | | | |

Integrationprofiles →

METHOD AND SYSTEM FOR SECURE HANDLING OF ELECTRONIC BUSINESS TRANSACTIONS ON THE INTERNET

CROSS-REFERENCE TO RELATED APPLICATIONS

This application is a national stage application of and claims priority from PCT International Application Number PCT/EP02/13493 filed 29 Nov. 2002, which claims priority from EP Application Number 01130600.8 filed 21 Dec. 2001. These disclosures are hereby incorporated by reference herein in their entireties. PCT International Application Number PCT/EP02/13493 was published in the English language as International Publication Number WO 03/055170 A1 on 3 Jul. 2003.

BACKGROUND OF THE INVENTION

The invention generally is in the field of computer-related transactions in the Internet arena and more specifically concerns a method and system for handling end-to-end business transactions in a Transmission Control Protocol/Internet Protocol (TCP/IP) environment.

Known Business-to-Customer (B2C) or Business-to-Business (B2B) service transactions can be divided into services being delivered electronically, e.g. media streaming, file transfer, e-mail, SMS, games, etc., and services which demand for physical delivery of goods like retail business. Professional websites or web portals providing the aforementioned services need to have implemented a process for limiting user access to those users having necessary access rights.

A known particular problem in that arena thus is authentication by third parties, in the following simply referred to as user authentication. Since the Internet Protocol, under a process view, is stateless, in order to guarantee authenticity of a user entering an access restricted website or web portal, it is necessary to perform a user authentication procedure repeatedly when entering another or even the same website or portal again.

A first approach addressing the above issue is disclosed in European patent application EP 1 039 724 A2. Described is a system for user authentication by means of the user's IP address which is assigned to a user's computer by a Dynamic Host Configuration Protocol (DHCP) server. Hereby the data pair user/IP address is used for user authentication on side of an authentication server. After that server has detected that the user is authorized, the mentioned data pair is stored in a Lightweight Directory Access Protocol (LDAP) server. The stored information can then be used for authentication of the user in applications running on other computers.

As another approach, PCT application WO 113 598 A2 discloses a dynamic wireless Internet address assignment scheme for user authentication. A unique IP address is assigned to a user of a mobile communication device communicating via an Optical Burst-Switching (OBS) network. The OBS, in particular, includes a master ticketing authority that maintains a database of unique IP addresses that can be assigned to users entering the network. The OBS further includes a gateway, a master routing database, and at least one mobile communication device in contact with an OBS. In that approach, authentication of users in the network is accomplished through the transmittal of encrypted random numbers between a user authentication site and a mobile communication device.

The above discussed prior art approaches comprise or require rather complex and expensive technology for handling the subject end-to-end business transactions between a user and one or more Internet sales-entity (product, etc.) and/or service providers where the business transaction strictly requires access authorization by the user to the one or more websites or -portals.

In addition, the above mentioned DHCP protocol does not allow to determine the end or termination of an existing online session of a user. Since an IP address is allocated dynamically, a third person can principally abuse an already allocated IP address, as the IP address is still registered on the LDAP server in the name of the preceding user. This existing approach insofar can not be regarded to be secure.

In addition, the known approaches do not provide a technically simplified platform for service delivery and payment in an IP environment on the Internet, as mentioned beforehand. In addition, accounting within the internet is not solved at the moment in general. Furthermore, there is no network based on the edge available authentication and access control facility. Nowadays every service provider has to install their own application specific solution.

SUMMARY OF THE INVENTION

It is therefore an object of the present invention to provide a method and system for handling beforehand discussed end-to-end business transactions, i.e. transactions between a user and a sales-entity/service provider as defined above but not e.g. transactions between a user and an Internet Service Provider (ISP), which enable a secure way related predominantly to determination and/or trust of authenticity of both persons involved in the transaction and which enable to perform those business transactions with minimum technical and cost efforts.

The above objects are achieved by the features of the independent claims. Advantageous embodiments are subject matter of the subclaims.

The underlying concept of the invention is provision of a managing or server instance, preferably being implemented as a middleware arranged between an IP layer and a server layer in the known Open Systems Interconnection (OSI) reference model, that allows for a one time and unique user or subscriber logon, hereinafter referred to as "single sign-on" (SSO) and that provides a pool of IP addresses available for allocation to such users. With the approval of the user logon, the server instance allocates an IP address from the pool and a continuous point-to-point (PPP) IP connection between the server instance and the user's computer or telecommunication device is established. At the same time, the user's IP address together with any attributes relevant for accounting, authentication and authorization (AAA) are recorded or stored. Further, the user's network access is continuously monitored and it is determined if said online session is terminated. If so, the allocated IP address for the user is invalidated and said IP address provided back to said pool of IP addresses.

In a preferred embodiment, a tunneling IP connection (virtual private network connection) is continuously established between the server instance and a user's computer or telecommunication device wherein providing a very reliable mechanism for detection of the termination of an online session by a user thus securely prevents the above mentioned situation with increased potential of abuse or misuse of an already assigned IP address. It should be emphasized that reliability of that mechanism is mainly obtained through the combination of the continuous IP connection and the direct monitoring of the user's network access behavior.

In one aspect of the invention, the user's current IP address is used as an authorization token during the following online session. Now, the stored information can be made available by the server instance to an e-Company where the particular user/subscriber has a valid subscription, standard protocols to IP applications for authentication, authorization, and accounting can be applied between the e-Company and any e-Service provider with whom the user/subscriber is interested to conduct any kind of e-Commerce business(es).

In another aspect, at least said IP address allocated to said user together with at least one attribute relevant for accounting and/or authentication and/or authorization are continuously recorded or being stored. An exemplary attribute is the user's telephone number.

In another aspect, the server instance (middleware) keeps full control of the IP address assignment process in view of the limited pool of available IP addresses and the role of the server instance for assigning an IP address to a signed-on user and thus the IP address, in accordance with the invention, functions as a unique identifier for a user that can be used for further authentication procedures to be conducted during the following online session by the user.

In accordance with the proposed authentication process, an IP address is assigned to the user/subscriber during the single sign-on authentication procedure performed in the network of the respectively underlying network service provider of the user or the like. It is emphasized hereby that assignment or allocation of the IP address from the pool of available IP addresses is a necessary part of the proposed functionality of the server instance or middleware, respectively. The proposed procedure hereby supports assignment of dynamic IP addresses as well as static IP addresses.

The correlation between a user's authentication name and the existing IP address assigned to that name as well as the book-keeping of the validity of that correlation is handled exclusively by the above mentioned server instance (middleware) by means of a session context. Any identification process for a user/subscriber who would like to use any service offered by an e-Service provider will be conducted solely using the assigned IP address. As a consequence, the real identity e.g. represented by the user name or other user specific information, must not necessarily be provided to the above mentioned e-Service provider(s). However, certain user attributes, if additionally required for requested services and/or goods, can exceptionally be made available to the e-Service provider(s) by the middleware. For the latter procedure only the IP address assigned to the user/subscriber at the time of provision of such additional information is required.

In a preferred embodiment, the session context comprises or includes transaction events performed by the user, in particular accounting starts or the like in order to continuously keep valid authenticity of the user during a whole online session and in order to use the existing authorization by the user end-to-end business transactions like video-on-demand services offered on websites or Internet portals of e-Service providers.

The proposed mechanism thus advantageously allows a user to approach different commercial websites or portals on the Internet during a continuing online session in order to perform different B2C transactions as mentioned above. For handling those transactions, the user is not required to conduct further sign-on procedures on side of the e-Service providers again and again since the server instance keeps an existing measure for authenticity of the user. Further, AAA procedures are handled by only one instance, namely the server instance according to the invention. The invention hence is a general solution to the problem of reliable Authentication, Authorization, and Accounting regardless of the technology and method to access the IP services.

When the user signs (logs) out or is somehow disconnected from the server instance, the server instance terminates the user's session context and by this closes the currently pending user session. After that all provisioned services will be stopped and no authorization will be granted, until the user logs in again. However, any pending sales entity context beyond the will continue independently of the terminated session context. The information within the database will be used to provide the connection between services, to be provisioned and accounted, and the user or subscriber account. The accounting information too will be available for any billing application associated with the service or the access provider. The proposed session context therefore solves the above mentioned problem of statelessness of TCP/IP, too.

It is noteworthy that the combination of single registry (SSO) and processing of a user's IP address in order to obtain an uninterrupted session context which is continuously maintained during the following user session guarantees authenticity of the user throughout the continuous online session and thus it is advantageously avoided to perform further sign-on procedures on side of each sales-entity and/or service provider approached during the session.

In other words, the IP address is used by the invention as a key instrument of the proposed server instance since the IP address is the only information required for any service instance in any of the two groups (virtual/real) to resolve an authorization request towards the server instance. This is the base for secure charging or payment, Quality-of-Service (QoS) delivery and consumption. Another advantage of this technique is that the client is anonymous outside, on any service layer. Potentially any real world entity represented by an IP-address may become a service recipient which may require billing.

The proposed process enables securely handling of the above mentioned transactions, despite the pre-mentioned statelessness of TCP/IP protocol, and thus effectively prevents the sales-entity and/or service providers from intrusions by others, i.e. non-authorized accesses to access-restricted websites or Internet portals, due to the session context related access control based on the unique IP address. The randomly changing IP address between consecutive sessions guarantees maximum secure access authorization handling. The invention thus effectively protects sales-entity and/or service providers against illegal intrusions by unauthorized users but with minimum security efforts. It is further to be noted that the session context, due to its randomized character, can not be simulated by an intruder. In addition, delivery and payment are solved in any conceivable scenario using the Internet Communication Protocol TCP/IP as basic transport scheme for e-companies integration. Thereupon, no additional information has to be transferred in order to conduct further sign-on procedures by the user during the session.

The invention can be applied to computer networks on a global scale. The only requirement is that the users have some IP connectivity. The proposed server instance, in a first aspect, can be part of a global network like IBM's global network or any other messaging service network (MSN). This would yield a business model comprising only one player as payment mediator controlling any business transaction between customers and service providers on the one hand, and sell and charge his own services directly to his users/subscribers on the other hand.

Alternatively, the server instance can be provided by a large network operator, e.g. a common application service provider (ASP) or telecommunication company which will provide hosting services to any number of e-companies. In this case either that company offers payment mediation services, or any hosted e-company, or both.

BRIEF DESCRIPTION OF THE DRAWINGS

The invention will be described in the following by way of a preferred embodiment. Hereby reference is made to the accompanying drawings. In the drawings

DETAILED DESCRIPTION OF THE PREFERRED EMBODIMENT

Figure 1:
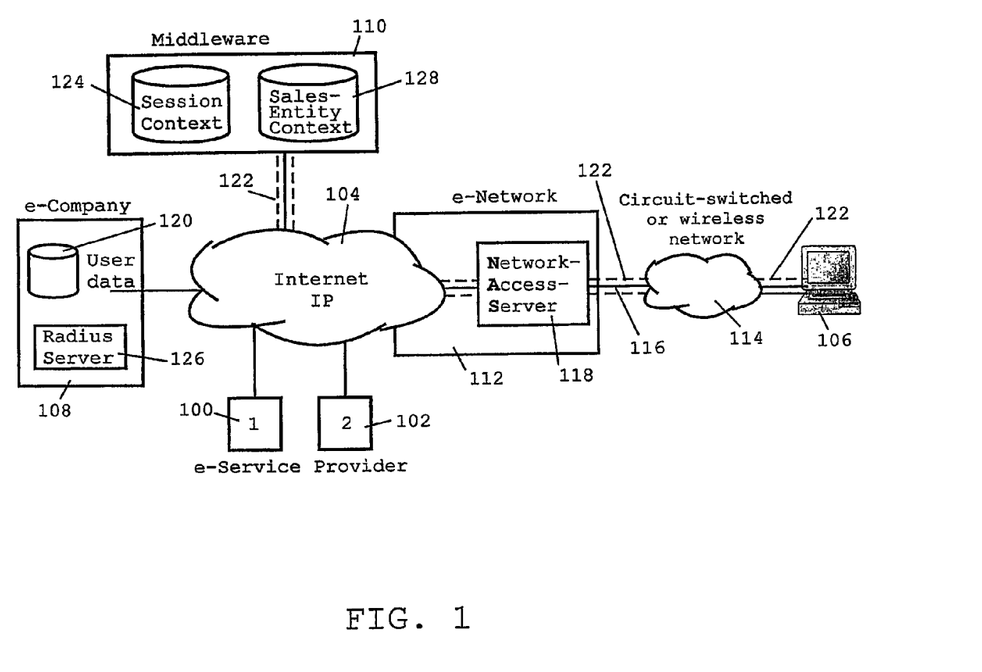
FIG. 1 is an overview block diagram illustrating a typical B2C service Internet environment in accordance with the invention.

The B2C environment exemplarily shown in FIG. 1 illustrates the basic principals of the invention by way of a typical B2C Internet environment including two exemplary (Internet) e-Service providers 100, 102 (in the following referred to as 'sales-entity or service providers') connected to the Internet 104 which stand for a number of other potential sales-entity/service providers not shown here. The shown network environment enables a user to perform business transactions from a user's computer 106 (PC or workstation) with those e-Service providers 100, 102. The B2C environment, more particularly, includes a so-called "e-Company" 108 that offers a server instance 110 for handling these end-to-end business transactions between the user and the number of sales-entity or service providers 100, 102. The server instance 110, in the present embodiment, is implemented by a dedicated middleware arranged between an IP layer and a server layer (OSI model), as discussed in more detail hereinafter.

The user's computer 106 accesses the Internet 104 via an e-Network provider 112 (=Internet access provider) wherein the connection between the computer 106 and the e-Network 112, in the present embodiment, is based on a usual telephone connection using a Plain Old Telephone Service (POTS) 114, an Integrated Services Digital Network (ISDN) switching network, or the like.

During a first log-on by the user to the e-Network provider 112, a communication channel 116 to a Network-Access-Server (NAS) 118 of the e-Network provider 112 is established. The NAS 118 is connected to a database 120. The database 120 particularly stores user information for the customers of the e-Network provider 112 and thus can perform a user authentication procedure during log-on of the user. The e-Network provider 112 further holds a stock (pool) of available IP addresses A, B, C, D, etc. After successful user log-on, the user is assigned one of these IP addresses, in the present example address 'A'.

It is now assumed that the user holds a special subscription with the e-Network provider 112 for performing end-to-end business transactions, or even private end-to-end transactions with other Internet users, using the server instance 110 of the invention. In that case, the provider 108 of the server instance (middleware) 110, in advance, provides a virtual private network (VPN) dialer to the user's computer 106 that can be used for those transactions. The VPN dialer enables to build up a virtual private network connection, in form of a point-to-point (PPP) connection, between the user's computer 106 and the server instance 110. Hereby, the user is assigned another IP address out of the pool of existing available IP addresses on side of the server instance 110. The pending VPN connection based on the new IP address 'b' is particularly implemented as an IP tunneling connection 122 between the user's computer 106 and the server instance 110, as indicated by the dotted line in FIG. 1.

A VPN, as known in the prior art, is a group of two or more computer systems, typically connected to a private network (a network built and maintained by an organization solely for its own use) with limited public-network access, that communicates "securely" over a public network. VPNs may exist between an individual machine and a private network (client-to-server) or a remote LAN and a private network (server-to-server). Security features differ from sales-entity (product) to sales-entity, but most security experts agree that VPNs include encryption, strong authentication of remote users or hosts, and mechanisms for hiding or masking information about the private network topology from potential attackers on the public network.

Now summarizing the principles of the embodiment illustrated in FIG. 1, the above described server instance 110 demands and insures single log-on for user authentication. A user log-on establishes a session context 124 between the user's currently assigned IP-address and his account. Any transaction with an arbitrary e-Service provider 100, 102 will be authorized using the proposed server instance 110 during the lifetime of the session context 124. The authorization of any e-Service 100, 102 towards the server instance 110 will only require the clients IP-address, which is the most basic attribute in the Internet 104 as such.

More specific, an e-Service provider 100, 102 like an Internet shop integrated as proposed herein, would just have to use the user's IP-address to authenticate the user, by using a query service which is part of the proposed server instance 110 architecture. The user, in turn, may only use an alias within the e-Service provider 100, 102. The server instance 110, in turn, keeps track of any accounting events in terms of e.g. service identifier, number and price. This additionally allows for pre-billing and surveillance of prepaid accounts and/or budgeted accounts for basic billing requirements usually found in the area of micro-payments. The accounting records thus can be forwarded to a post billing instance. That post billing instance interfaces to an instance owning pricing plans.

The proposed server instance (middleware) 110 supports any number of e-companies which are defined as follows: They either offer a single service or a variety of services either owned by themselves or based on partnership agreements with others. The key requirement is, that these companies maintain and own contractual relationships to their subscribers, kept in a customer care or even self care system. The user attributes maintained here for each user and user sub account may be grouped as follows: Attributes relevant for User Account Authentication and Authorization, e.g. User ID, Account Number, Password, User-Alias . . . , full user address details, e.g. full address information, passport number etc., generic content related, e.g. filters, user preferences . . . , payment related, e.g. from which bank account to collect micro payments or other payments. Further, in an environment of real goods, invoicing is triggered after customer delivery and customer acknowledgement. This will be achieved by introducing workflow components that will include mobile access techniques as well as parcel services. Again the already established real world rules will apply.

In addition, it is noteworthy that the server instance 110, due to the IP tunneling connection 122, can be physically located anywhere in the Internet 104, but preferably will be located inside the Firewalls of an Intranet of the e-Network provider 112, or the e-Company 108 likewise, if the e-Company 108 is a separate company from the e-Network provider 112. Further, the server instance 110, in the preferred embodiment, uses a Remote Authentication Dial In User Service (RADIUS) protocol, provided by a dedicated RADIUS server 126, discussed hereinafter.

It is emphasized that, in cases where the e-Network provider 112 is also providing the above described e-Company services 108 based on a server instance 110 in accordance with the invention, i.e. is keeping the server instance 110, it is not necessary to assign the above mentioned two IP addresses during log-on of the user since the middleware provider then will assign the IP address for authentication purposes.

Figure 2:
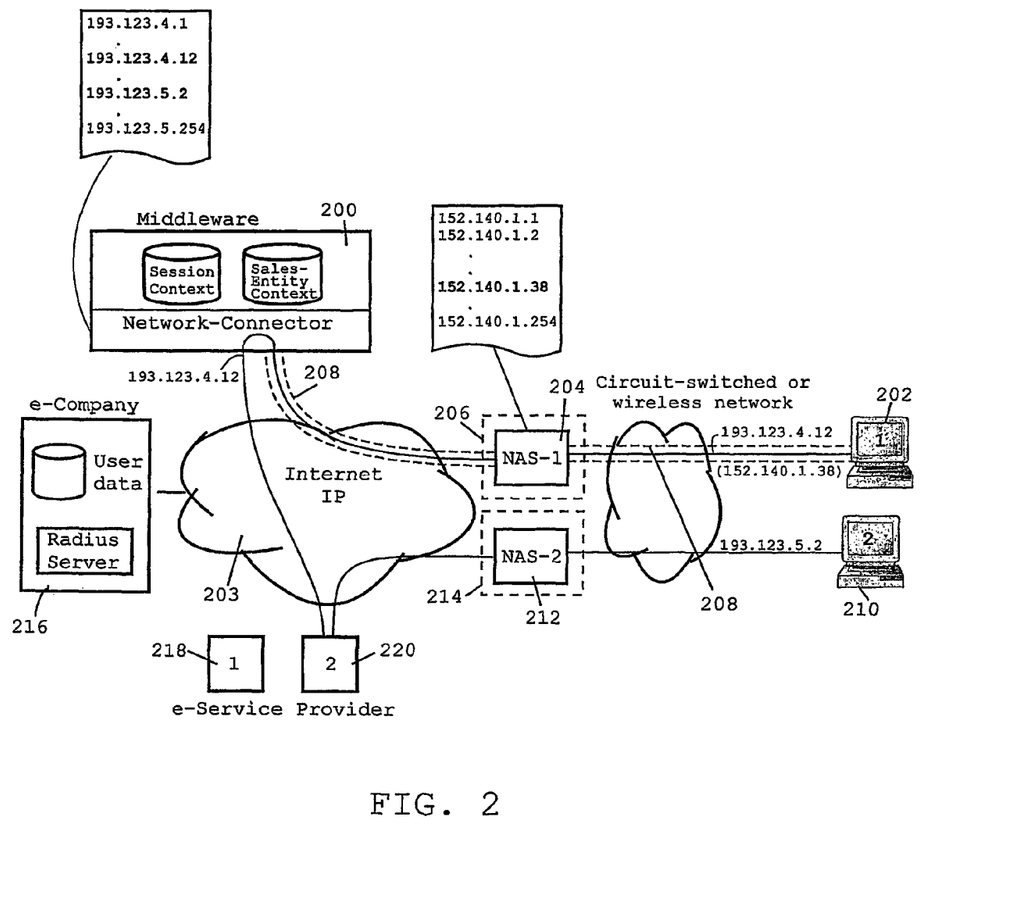
FIG. 2 illustrates basic principles for assignment of IP addresses on the Internet according to the prior art.

Referring to FIG. 2, basic aspects concerning assignment of IP addresses according to the prior art are illustrated. FIG. 2 shows an example of two possible connection scenarios using the server instance (middleware) 200. A first computer 202 has Internet 203 access using NAS-1 204, which belongs to a first e-network provider 206. The first e-network provider 206 is not using the middleware 200 to authenticate users and assign IP-addresses. The first e-network provider 206 has his own pool of IP addresses (e.g. 152.140.1.1/0) which are unknown to the middleware 200. The first computer 202 runs a tunneling client, which establishes a tunneling connection 208 to the middleware 200, allowing him to authenticate himself and receive a "middleware" IP-address (193.123.4.12). As described above and in the following in more detail, the middleware 200 creates a session context for the first computer 202 and maintains that session context until his sign-off. Having this IP-address, the first computer 202 can take advantage of all the features provided by the middleware 200 e.g. single sign-on.

A second computer 210 has also Internet 203 access using NAS-2 212, which belongs to a second e-network provider 214, using the middleware 200 too to authenticate and assign IP-addresses. The second e-network provider 214 also uses his own pool of IP-addresses (193.123.5.1/0), which are, in contrast to the first e-network provider 206, known/handled to/by the middleware 200. Because the Internet access of the second computer 210 via NAS-2 212 is controlled by the middleware 200, in this case, no tunneling connection is necessary to generate/maintain the necessary session-context.

Like the B2C scenario illustrated in FIG. 1, both computers 202, 210 can conduct business transactions with e-companies 216 and/or e-service providers 218, 220 using the middleware 200, regardless of if they received their "middleware" IP-address via a NAS or via a tunneling client, as described beforehand.

Figure 3:
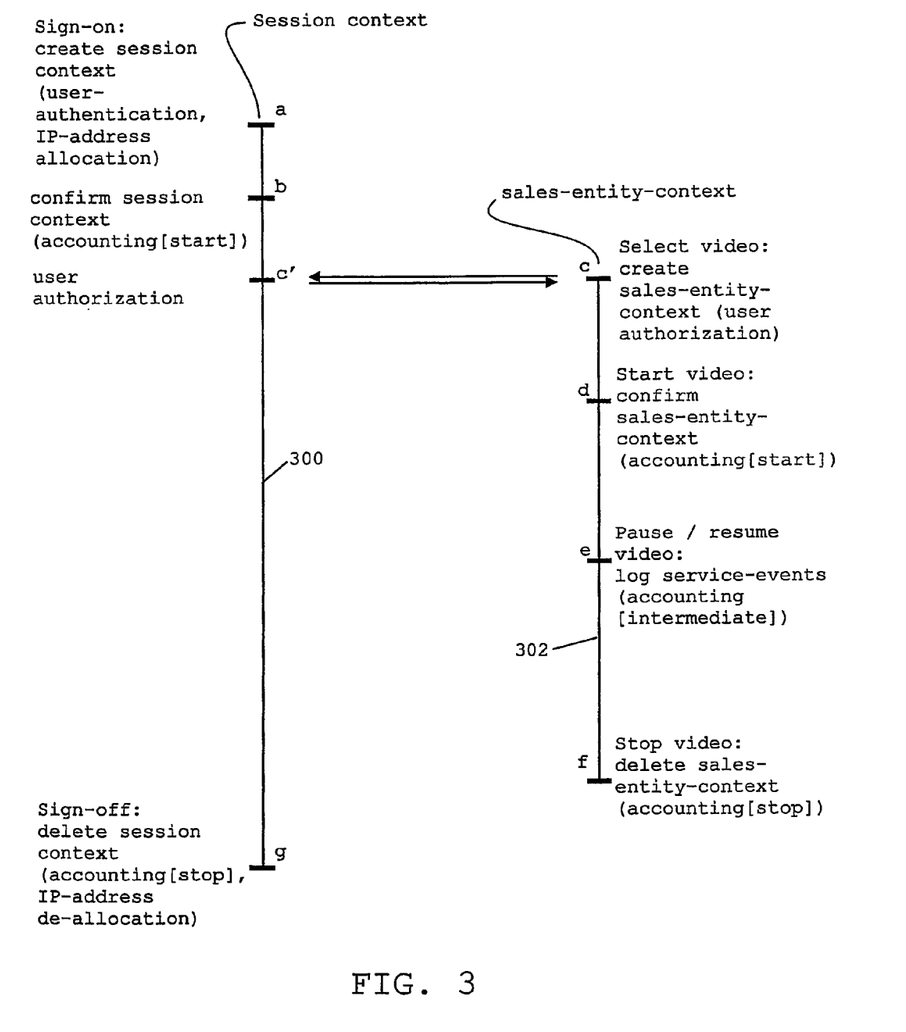
FIG. 3 depicts the process flow of a preferred embodiment of the invention by way of a flow diagram.

Referring now to FIG. 3, a preferred embodiment of the transaction process according to the invention by way of a process flow diagram is illustrated. FIG. 3 also shows the basic principles of how to establish a session context within an IP network and how to provide services and track all relevant accounting information and billing parameters based on dedicated service characteristics. In the diagram, the y direction, starting from the top, represents the time t, and the two vertical lines 300, 302 arranged in the x direction, represent to different transaction contexts, in the present example particularly to the pre-described session context and, in addition, one sales entity context (reference number '128' in FIG. 1).

The process begins with a sign-on procedure (step 'a') by the user which includes user authentication, as described beforehand. An IP address is assigned and a session context is created using the above mentioned RADIUS protocol. A session context records RADIUS-provided information like: Username, Framed-IP-Address and Class, Acct-Session-ID. The session context expires, when the user signs (logs) out or is disconnected.

Only during a pending session context, other transaction events initiated by the user or any e-Service provider being involved in a business transaction can principally occur wherein the session context is confirmed (step 'b'). The moment a user orders a sales-entity, an Authorization-Request is sent (step 'c"') to the server instance (reference number '110' in FIG. 1). The middleware validates the user's sales-entity request and grants that the user is liable for these costs. A so called sales-entity context is generated (step 'c'). In the present example, the user requests a video-on-demand service from the e-Service provider. After his successful authorization (step 'c"'), the start of the requested video-on-demand (VoD) service is indicated (step 'd') with an Accounting-Message (Acct-Start). When the VoD-service is finished, e.g. having downloaded or streamed the complete video file, an Accounting-Message (Acct-Stop) is generated in order to conduct the necessary billing for the downloaded video. The pending sales-entity context is deleted (step 'f').

When the user signs off, the recorded session context is deleted and the pending IP address de-allocated. Further an accounting-stop event is triggered (step 'g').

Any special service-event like rewind, pause/resume or forward the video during the streaming, will trigger an Accounting-Message (Acct-Intermediate).

The described session context is maintained by the proposed middleware. Any service layer will interface to the middleware in terms of service authorization and accounting.

It is emphasized that any security holes (viruses, worms or other attacks onto the client's computer) being existent throughout a pending online session comprising the above described session context can be resolved on side of the client's computer using known Firewall software solutions which effectively controls and monitors operating systems sockets. These security software solutions can be provided by an e-Company (in the above sense) as an e-Service (also in the above sense). In combination with the above described communication protocol, particularly including the session context, the security level achieved hereby is much more higher than in prior art approaches.

Figure 4:
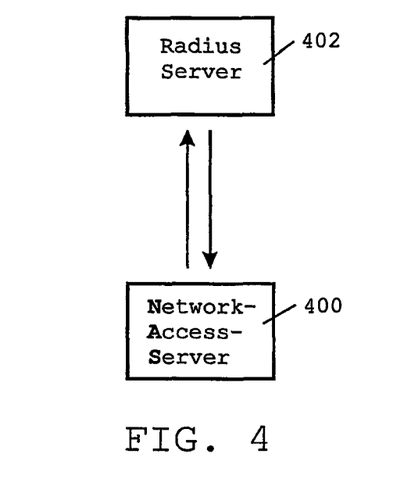
FIG. 4 illustrates the RADIUS protocol known in the prior art for providing authentication, authorization and configuration information between a Network Access Server (NAS) and a Shared Authentication Server.

In the following, referring to FIG. 4, the previously mentioned RADIUS (Remote Authentication Dial In User Service) protocol, published e.g. in RFC2865, RFC2866, RFC2867 and RFC2868 (www.ietf.org) is described in more detail.

The RADIUS protocol sets out a method of carrying out authentication, authorization and configuration information between a Network Access Server (NAS) 400 and a Shared Authentication Server. A first key feature of RADIUS is the underlying Client/Server Model where a Network Access Server (NAS) operates as a client of RADIUS. The client is responsible for passing user information to designated RADIUS servers 402, and then acting on the response that is returned. In contrast to that, RADIUS servers are responsible for receiving user connection requests, authenticating the user, and then returning all configuration information necessary for the client to deliver service to the user. A RADIUS server can act as a proxy client to other RADIUS servers or other kinds of authentication servers.

It should be mentioned that communication between a NAS and a RADIUS server is based on the known User Datagram Protocol (UDP). UDP, documented in protocol standard RFC 768, provides users access to IP-like services. UDP packets are delivered just like IP packets—connectionless datagrams that may be discarded before reaching their targets. UDP is useful when TCP would be too complex, too slow, or just unnecessary. More particularly, UDP is defined to make available a datagram mode of packet-switched computer communication in the environment of an interconnected set of computer networks. This protocol assumes that the Internet Protocol (IP) is used as the underlying protocol. UDP is mainly used in application programs to send messages to other programs with a minimum of protocol mechanism. The protocol is transaction oriented, and delivery and duplicate protection are not guaranteed. Applications requiring ordered reliable delivery of streams of data should use the Transmission Control Protocol (TCP).

The above mentioned authentication request message contains the user-supplied name and password, as well as the identity of the access device sending the request and the port being used for the remote connection. Since communication with the RADIUS server occurs across the network, the user-supplied password is typically encrypted by the NAS before the authentication request is sent to minimize the chance for compromise.

The authentication request can be sent to either a "local" RADIUS server via the local area network or to a "remote" server over a wide area network. This provides flexibility in designing the overall network architecture by allowing placement of the RADIUS server at the most appropriate location, not necessarily at the physical point of remote access. This is an important feature in cases where a "host" organization must maintain control of the authentication process but wishes to outsource most or all other elements of the remote access infrastructure. The RADIUS protocol also facilitates authentication redundancy by allowing the client devices to route requests to alternative servers if the primary RADIUS server cannot be reached.

When the RADIUS server receives the authentication request, it validates the request (to ensure it originated from a valid client device) and then decrypts the data packet to expose the user name and password. These credentials are then passed to the system being used to conduct the authentication process. The information used to authenticate the user sign-on (log-on) request can be contained in a password file, centralized authentication database, or a custom (or proprietary) system. Other commercial security systems (e.g., Kerberos) that support the RADIUS protocol can also be interfaced with to provide authentication.

If the credentials (name and password) of the user requesting access are properly matched against the stored information, the RADIUS server returns an authentication acknowledgement message to the NAS. This message contains the connection information (network type and services) necessary for attaching the authenticated user to the network. Hence, the type of connection (TCP/IP, PPP, SLIP, etc.) and access restrictions are applied to the user's login in accordance with pre-established policies. In the opposite case, if the credentials received from the RADIUS client do not match information in the authentication information store, the server returns an authentication reject message to the NAS. This message causes the NAS to deny access to the user requesting it.

In addition to the encryption of the user password during communications between the NAS and the authentication server, the RADIUS protocol also provides for additional security to avoid compromise of authentication via tampering with the message transfer process. As mentioned above, the messages passed between RADIUS clients and servers are validated to prevent "spoofing" of these requests. The RADIUS server accomplishes this by sending an authentication key to the RADIUS client devices. This message acts as a digital signature to ensure that the proper authentication server is truly originating authentication messages.

The RADIUS protocol thus provides a high level of network security since transactions between the client and RADIUS server are authenticated through the use of a shared "secret", which is never sent over the network. In addition, any user passwords are sent encrypted between the client and RADIUS server, to eliminate the possibility that someone snooping on an unsecure network could determine a user's password.

In addition, RADIUS provides flexible authentication mechanisms since the RADIUS server can support a variety of methods to authenticate a user. It can support PPP PAP or CHAP, UNIX login, and other authentication mechanisms. Last but not least RADIUS is a highly extensible protocol since all transactions are comprised of variable length Attribute-Length-Value 3-tuples. New attribute values can be added without disturbing existing implementations of the protocol.

Concerning authentication and authorization, the RADIUS server 402 can support a variety of methods to authenticate a user. When it is provided with the username and original password given by the user, it can support PPP, PAP or CHAP, UNIX login, and other authentication mechanisms. Typically, a user login consists of a query (Access-Request) from the NAS to the RADIUS server 402 and a corresponding response (Access-Accept or Access-Reject) from the server. The Access-Request packet contains the username, encrypted password, NAS IP address, and additional information of the type of network connection.

When the RADIUS server 402 receives the Access-Request from the NAS, it searches a database for the username listed. If the username does not exist in the database, either a default profile is loaded or the RADIUS server 402 immediately sends an Access-Reject message. This Access-Reject message can be accompanied by a text message indicating the reason for the refusal.

The RADIUS accounting functions allow data to be sent at the start and end of sessions, indicating the amount of resources (such as time, packets, bytes, and so on) used during the session. An Internet service provider (ISP) might use RADIUS access control and accounting software to meet special security and billing needs.

Transactions between the client and RADIUS server 402 are authenticated through the use of a shared secret, which is never sent over the network. In addition, user passwords are sent encrypted between the client and RADIUS server 402 to eliminate the possibility that someone snooping on an insecure network could determine a user's password.

Figure 5:
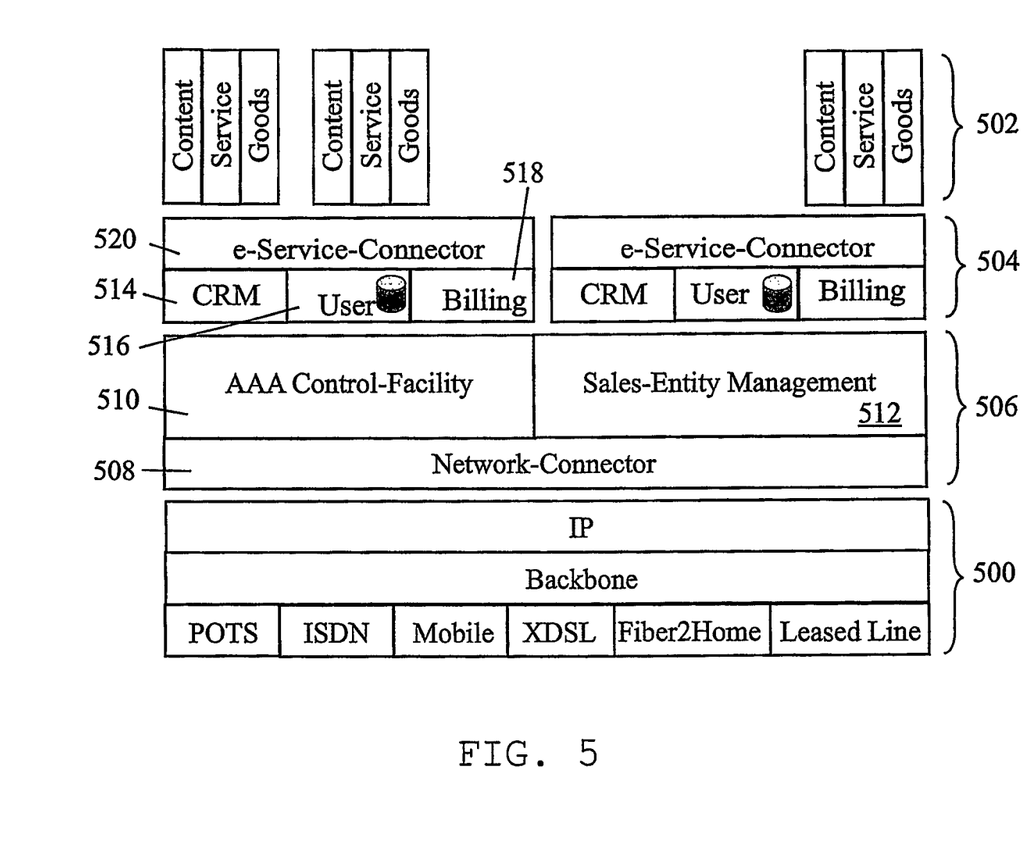
FIG. 5 is a schematic block diagram illustrating a network layer structure including a middleware according to the invention.

The information technology (IT) based process or service according to the invention, in terms of the (OSI) model, preferably is implemented beyond an IP layer as a server instance or middleware of a server, as being illustrated in FIG. 5. It can be seen from FIG. 5 that the process is based on an interaction scenario comprising four main components, an e-Network Provider 500 providing the basic network infrastructure and backbone for executing the underlying communication protocols, one or more e-Service Providers 502 which a (not shown) user is interested to do any kind of commercial or even non-commercial business(es), an e-Company 504 for managing the entire process and a middleware 506 arranged on top of the network infrastructure for processing a so-called "session context" as described in more detail hereinafter and for providing AAA control facility and sales entity management for conducting the prementioned businesses in accordance with the novel business process according to the invention.

FIG. 5, for that purpose, depicts the general architectural structure of the proposed solution. In the present embodiment, the key point is that the middleware engine resides upon the IP network layer, provided by an e-Network Provider. This e-Network Provider can support several access method (like POTS, ISDN, Mobile, . . . ). The different components shown in FIG. 5 are 1. Network-Connector 508

When a client accesses the Middleware 506 via a network, which is not operated by the Middleware Provider, it is necessary to establish a session context with an IP-Address provided by the Middleware. This is done by the Network-Connector using VPN-Techniques like GRE, PPTP, L2F, L2TP or any other Tunneling-Protocol. This method ensures, that the client can be authenticated via the AAA Control-Facility, allowing him to take full advantage of the Middleware features without restricting his access to the (inter)net in any way.

If the e-Network Provider and the Middleware Provider happen to be the same company, there is no need for a VPN, because the AAA Control-Facility (2) of the middleware is the authentication authority for the network access as well, thus providing the client with a "Middleware" IP-Address.

2. AAA Control-Facility 510

The AAA Control-Facility is responsible for the authentication of the client providing an IP-Address after a successful verification of the user data against the user database of the corresponding e-Company. It keeps the client's session context until his logoff.

It authorizes the client, when he wants to consume or buy any sales entity provided by an e-Service provider. It compares authorization request against the user's profiles concerning service-subscription and personal information.

If the middleware provider happens to be the network provider of this client as well, it also maintains the user's access characteristics in an access profile, which also can be used for service authorization.

3. Sales-Entity Management 512

If a user/client wants to consume/buy a Sales-Entity, a context for this Sales-Entity is generated by the SE-Management. When a Sales-Entity is ordered, the e-Company asks SE Management to check if the cost of the Sales-Entity is covered in compliance with the customer's payment policy (prepaid account, credit line, credit card). The SE Management responds with a confirmation or a reject.

The SE Management keeps track of the different transactions and states during the whole buying process.

After the confirmation of the complete delivery of the Sales-Entity, an accounting event is generated and sent to the Billing component of the corresponding e-Company, the context then will be terminated.

The SE-Management uses techniques like Short Messaging Service, Interactive Voice Response, email, web-access for confirmation and notification of the different transactions during the lifecycle of the Sales-Entity context.

4. CRM 514

The CRM is used by the e-Company operator to maintain the customer User Database.

5. User Database 516

The User Database contains all information about the e-Company's customers
(user-profile like payment policies, address, age, . . . ; service-profile like subscriptions).

6. Billing 518

The Billing component of the e-Company interfaces to the different credit card and banking institutes. It conducts the payments for the consumed/bought Sales-Entities according to the customers preconfigured payment policy.

The Billing component also does the invoicing and carries out the payments to the e-Service Provider.

7. e-Service-Connector 520

The e-Service-Connector integrates one or several e-Service Provider into a sales/marketing platform. It allows the e-Service Provider to offer his Sales-Entities through the e-Company, without having the need to acquire customer informations and concern billing modalities.

Figure 6:
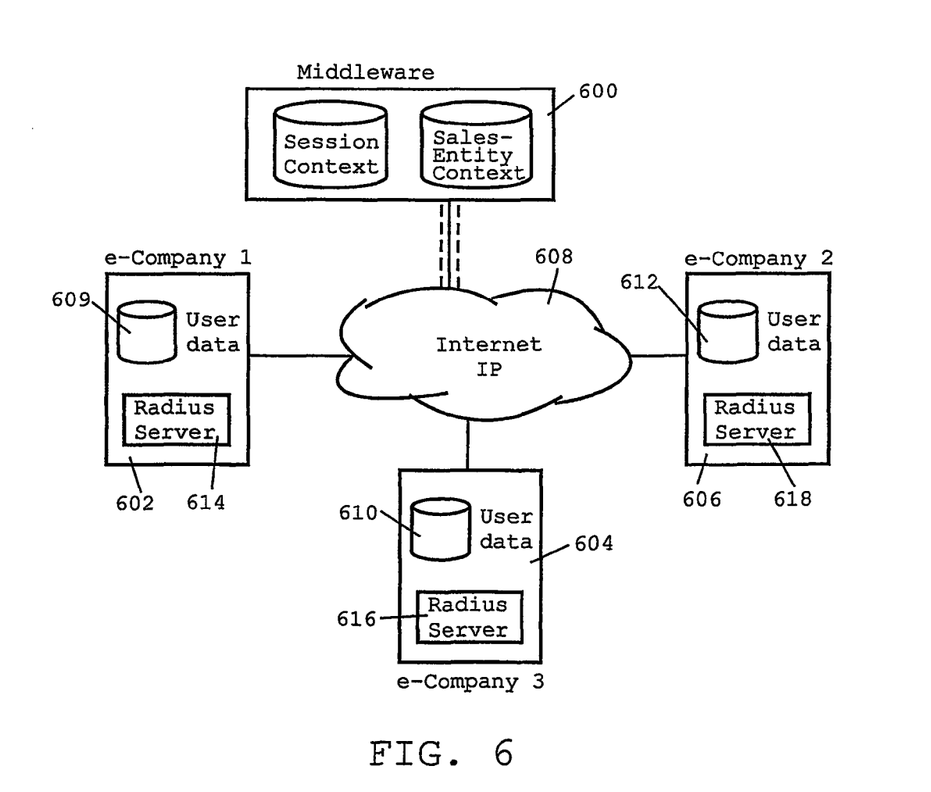
FIG. 6 illustrates interoperation of the proposed middleware with a number of e-Companies.

FIG. 6, shows a possible business-to-business (B2B) transaction environment, where the proposed middleware 600 inter-operates with three different e-companies 602-606 over the Internet 608. Each of these e-companies 602-606 holds a stock of users (customers), who can leverage the full advantage of all middleware 600 features. It is noteworthy that, in FIG. 6, the users, the NAS and the e-service providers are omitted for simplification purposes only. Further, each e-company 602-606 maintains a corresponding user database 609, 610, 612 for these users and a RADIUS server 614-618 for conduction the above described AAA services.

Figure 7:
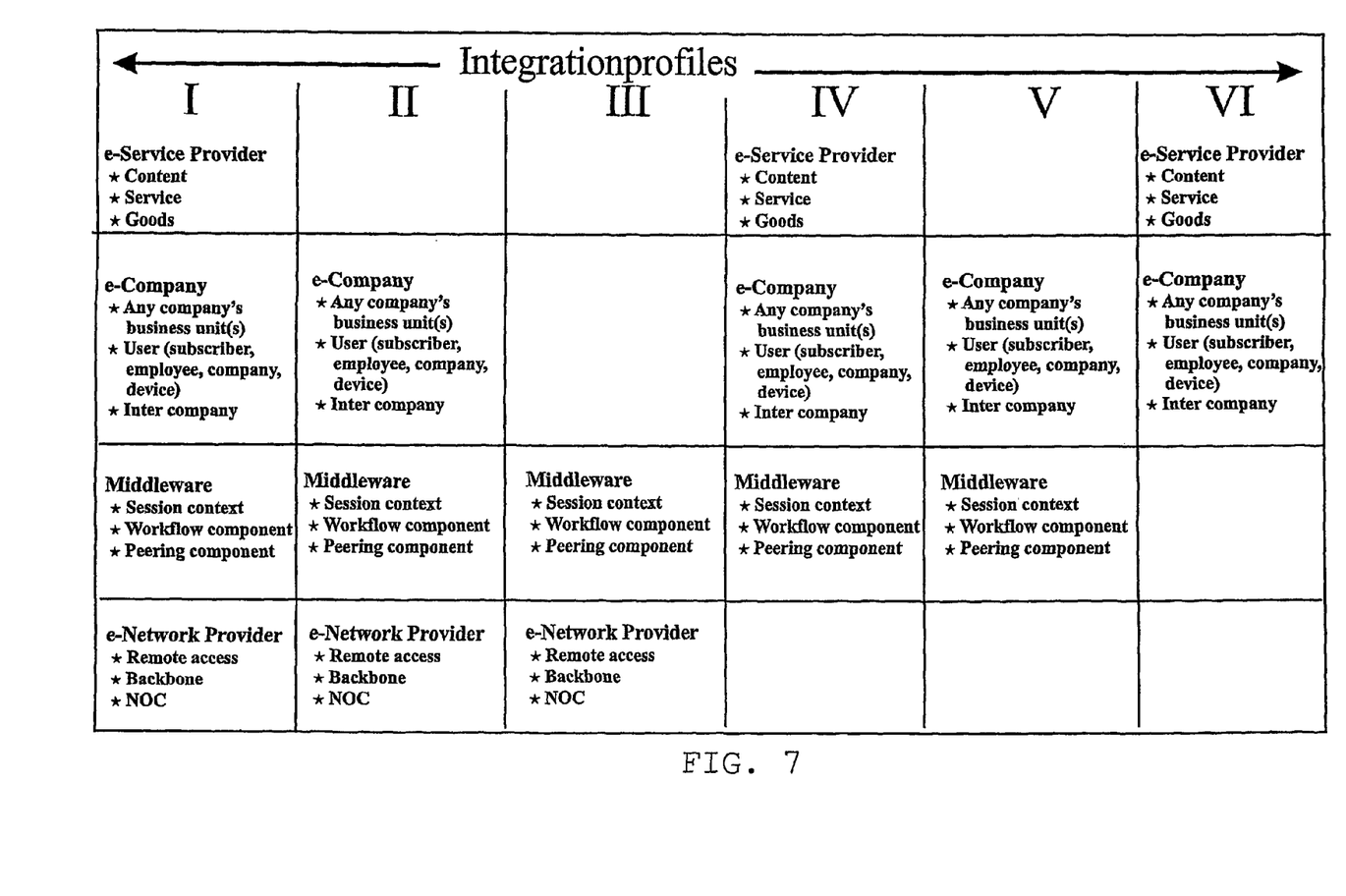
FIG. 7 depicts possible integration profiles for the main components of the network layer structure shown in FIG. 5.

Finally, in FIG. 7 possible integration profiles for the main components of the network layer structure shown in FIG. 5 are shown by way of an overview of all considered player roles. In theory there are some more possible combinations of the four main components, but they are of no practical meaning. In the following, the six shown Integration Profiles are described in more detail wherein referring to the numerals I)-VI) in FIG. 3.

I) A company, e.g. a Telco as a former classical network provider, which acts in all four layers (e-Network Provider, Middleware Operator, e-Company and e-Service Provider) is able to offer a multi-service ASP platform. In which the network operator with his business units also acts as an e-company by using his own infrastructure. He offers his own e-services and is able to integrate e-services from other service providers thus leveraging his large subscriber database. The Telco may as well offer real transaction based payment services to the integrated service providers (i.e. retailers).

II) Shows a company similar to the one that is described in I), which doesn't offer any e-Services of its own.

III) A Company that wants to host e-companies will act as e-network provider and middleware operator. It will offer access, delivery and secure, consumption-oriented payment and workflow management services. The company profile number VI) shows a possible customer for this company.

IV) Shows a variation of the company example I) that doesn't own any network services itself.

V) Shows a company which offers hosting services described in II) but operates no network of its own and offers no e-services.

VI) Shows a company offering e-services of its own and hosting services for e-service provider.

The invention claimed is:

1. A method for handling an end-to-end business transaction between a user and an e-Service provider consisting of at least one sales-entity and/or service provider via a TCP/IP controlled computer network and a server instance for managing the end-to-end business transaction, said method comprising:

performing, by a computer device, a log-on of a user to an e-Network provider in response to the user having initiated an online session, wherein the e-Network provider, an e-Company, a server instance, and the e-Service provider are independently connected to an Internet, wherein a Network Access Server within the e-Network provider is connected to the Internet and to a database within the e-Company, wherein said performing the log-on of the user comprises said e-Network provider authenticating the user via use of information about the user stored in the database;

after said performing the log-on of the user, selecting a first Internet Protocol (IP) address from a first pool of available IP addresses held by the e-Network provider and selecting a second IP address from a second pool of available IP addresses at the server instance;

assigning the selected first IP address to the user and then connecting the user to the Internet via the Network Access Server;

assigning the selected second IP address to the user and generating an IP tunneling connection that connects the user to the server instance via the Network Access Server and the Internet, wherein said generating the IP tunneling connection is based on the second IP address;

generating a session context that includes the second IP address;

said server instance receiving an authorization request from the e-Service provider when the end-to-end business transaction is initiated between the user and the e-Service provider;

responsive to said receiving the authorization request, said server instance validating the user's authorization for the end-to-end business transaction, wherein said validating is based on only on the second IP address in the session context; and responsive to detection of a termination of the online session, invalidating the second IP address, invalidating the session context, and returning the second IP address to the second pool of available IP addresses.

2. The method of claim 1, wherein said validating the user's authorization is performed by the context session using a Remote Authentication Dial In User Service (RADIUS) protocol provided by a dedicated RADIUS comprised by the e-Company.

3. The method of claim 2, wherein said generating the session context is performed using the RADIUS protocol.

4. The method of claim 1, wherein the IP tunneling connection is a virtual private network (VPN) connection.

5. The method of claim 1, wherein the end-to-end business transaction is a service provided by the e-Service to the user, and wherein method further comprises:

after said validating the user's authorization is performed and before the service has been provided by the e-Service to the user, said session context generating a sales-entity context pertaining to the service; and after the service has been provided by the e-Service to the user, said session context deleting the sales-entity context.

6. The method of claim 5, wherein the server instance comprises a Network-Connector, an AAA Control Facility, and a Sales-Entity Management, wherein the Network Connector performs said generating the session context in a manner that does not restrict access by the user to the Internet in any way, wherein said AAA Control Facility performs said validating the user's authorization, and wherein said Sales-Entity Management performs said generating a sales-entity context and said deleting the sales-entity context, and wherein the method further comprises:

after said service has been requested by the user and before the service has been provided to the user, said e-Company making a request to the Sales-Entity Management to determine whether a cost of the requested service is covered in compliance with a payment policy of the user; and responsive to said making the request, said Sales-Entity Management confirming to the e-Company that the cost of the requested service is covered in compliance with the payment policy of the user.

7. The method of claim 6, wherein the e-Company comprises the database, a billing component interfacing with different credit card and banking institutes, and an e-service-Connector, wherein the database comprises the payment policy of the user, and wherein the method further comprises:

after the service has been provided to the user, said billing department invoicing the user for the service and conducting payment to the e-service-Connector for the service according to the payment policy of the user; and said e-service-Connector integrating the e-Service provider into a sales/marketing platform which enabled the e-Service provider to offer the service to the user without a need for the e-Service provider to acquire information pertaining to the payment policy of the user.

8. The method of claim 1, wherein the session context resides upon an IP network layer provided by the e-Network provider.

9. The method of claim 1, wherein said generating the session context results in the generated session context including content comprising user identification information and continuously monitored transaction events by the user, and wherein the method further comprises performing accounting through use of said content with respect to the end-to-end business transaction.

* * * * *